United States Patent
Kozhaya et al.

(10) Patent No.: US 10,951,692 B1
(45) Date of Patent: Mar. 16, 2021

(54) DEPLOYMENT OF MICROSERVICES BASED ON BACK-END RESOURCE AFFINITY

(71) Applicant: International Business Machines Corporation, Armonk, NY (US)

(72) Inventors: Joseph Kozhaya, Morrisville, NC (US); Pritesh Patel, Raleigh, NC (US); Anantha S. Rao, Cary, NC (US); Craig Cook, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 16/549,736

(22) Filed: Aug. 23, 2019

(51) Int. Cl.
  G06F 15/16  (2006.01)
  H04L 29/08  (2006.01)
  H04L 12/911  (2013.01)
  H04L 12/40  (2006.01)

(52) U.S. Cl.
  CPC .......... H04L 67/1008 (2013.01); H04L 12/40 (2013.01); H04L 47/82 (2013.01); H04L 67/18 (2013.01)

(58) Field of Classification Search
  CPC ..... H04L 67/1008; H04L 47/82; H04L 67/18; H04L 12/40
  See application file for complete search history.

(56) References Cited

U.S. PATENT DOCUMENTS

| | | | |
|---|---|---|---|
| 9,396,042 B2 * | 7/2016 | Smith | G06F 9/5094 |
| 9,495,215 B2 | 11/2016 | Podvratnik et al. | |
| 9,769,084 B2 | 9/2017 | Udupi et al. | |
| 9,946,527 B2 * | 4/2018 | Sharma | G06F 8/60 |
| 10,574,743 B1 * | 2/2020 | Ntofon | H04L 67/322 |
| 2007/0130208 A1 * | 6/2007 | Bornhoevd | G06F 9/485 |
| 2011/0282982 A1 * | 11/2011 | Jain | G06F 9/5094 709/223 |
| 2011/0295999 A1 * | 12/2011 | Ferris | G06F 9/5072 709/224 |
| 2012/0239792 A1 * | 9/2012 | Banerjee | H04L 67/1097 709/223 |

(Continued)

OTHER PUBLICATIONS

"Frontend vs. Backend Web Development," Upwork Global Inc. copyright 2015-1019, accessed Jul. 21, 2019, 5 pages. https://www.upwork.com/hiring/for-clients/frontend-vs-backend-web-development/.

*Primary Examiner* — Padma Mundur
(74) *Attorney, Agent, or Firm* — Yee & Associates, P.C.

(57) ABSTRACT

Determining microservice placement to minimize response time in a network is provided. A set of resources utilized by a microservice during operation is identified based on inspecting a configuration file and code of the microservice. A deployed location within the network of each resource is determined. A relative weight value is assigned to each resource indicating a relative significance of each resource to the microservice during operation. A weighted-average response time is determined for each data center in a set of possible data centers to deploy the microservice based on the relative weight value assigned to each resource and a determined distance value measured by response time between the deployed location of each resource and each possible data center in the set. A data center in the set of possible data centers is selected to deploy the microservice based on the data center having a lowest determined weighted-average response time.

17 Claims, 5 Drawing Sheets

(56) References Cited

U.S. PATENT DOCUMENTS

| | | |
|---|---|---|
| 2012/0324069 A1 | 12/2012 | Nori et al. |
| 2013/0268672 A1 | 10/2013 | Justafort et al. |
| 2014/0032785 A1* | 1/2014 | Chaudhuri .......... H04L 61/1511 709/245 |
| 2016/0205204 A1* | 7/2016 | Fersman .................. G06F 8/60 709/226 |
| 2016/0378518 A1 | 12/2016 | Antony et al. |
| 2018/0324203 A1 | 11/2018 | Estes et al. |
| 2020/0322233 A1* | 10/2020 | Gao ................... H04L 43/0852 |

\* cited by examiner

DEPLOYMENT OF MICROSERVICES BASED ON BACK-END RESOURCE AFFINITY

BACKGROUND

1. Field

The disclosure relates generally to microservices and more specifically to determine microservice placement to minimize response time within a network, which includes a plurality of geographically disparate data centers, based on back-end resource affinity and deployment locations.

2. Description of the Related Art

Kubernetes is an open-source container-orchestration environment for automating deployment, scaling, and operations of application containers across clusters of host nodes. Kubernetes deploys, maintains, and scales applications based on processor, memory, storage, and/or other performance metrics. Kubernetes is a loosely coupled and extensible environment to meet different workload requirements. A host node, also known as worker node, is a machine where containers (i.e., workloads) are deployed. A container is the lowest level of a microservice that holds the running application, libraries, and their dependencies. Containers can be exposed to the world through an external internet protocol address. Kubernetes is commonly used to host microservices because Kubernetes provides all the capabilities needed for any microservice architecture.

Microservices are a software development technique that structures an application as a collection of loosely coupled services. In a microservice architecture, services are fine-grained and the protocols are lightweight. The benefit of decomposing an application into different smaller services is that it improves modularity. Microservice architectures enable continuous delivery and deployment. A microservice is a self-contained piece of business functionality with clear interfaces.

SUMMARY

According to one illustrative embodiment, a computer-implemented method for determining microservice placement to minimize response time in a network is provided. A set of resources utilized by a microservice during operation of the microservice is identified based on inspecting a configuration file and code of the microservice. A deployed location within the network of each resource in the set of resources utilized by the microservice is determined. A relative weight value is assigned to each resource in the set of resources utilized by the microservice indicating a relative significance of each respective resource to the microservice during operation. A weighted-average response time is determined for each data center in a set of possible data centers to deploy the microservice based on the relative weight value assigned to each respective resource utilized by the microservice and a determined distance value measured by response time between the deployed location of each respective resource in the set of resources and each respective data center in the set of possible data centers where the microservice may be deployed. A data center in the set of possible data centers is selected to deploy the microservice based on the data center having a lowest determined weighted-average response time. According to other illustrative embodiments, a computer system and computer program product for determining microservice placement to minimize response time in a network are provided.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
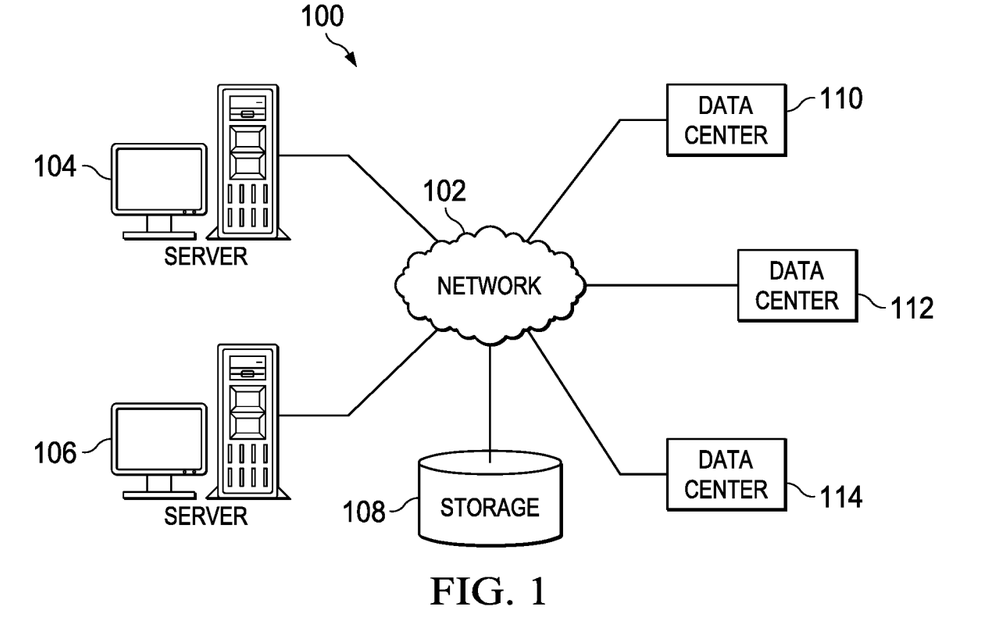
FIG. 1 is a pictorial representation of a network of data processing systems in which illustrative embodiments may be implemented.
Figure 2:
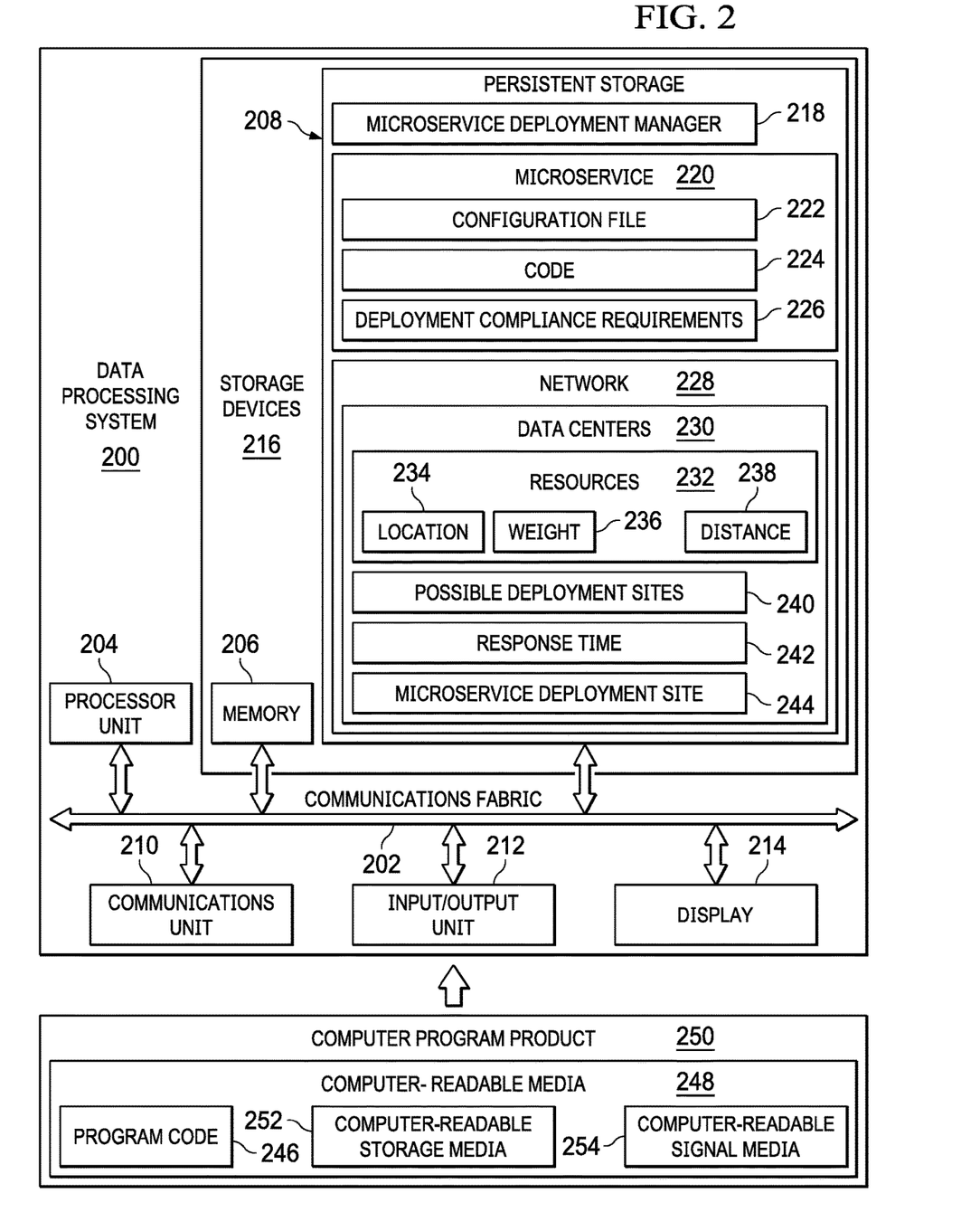
FIG. 2 is a diagram of a data processing system in which illustrative embodiments may be implemented.
Figure 3:
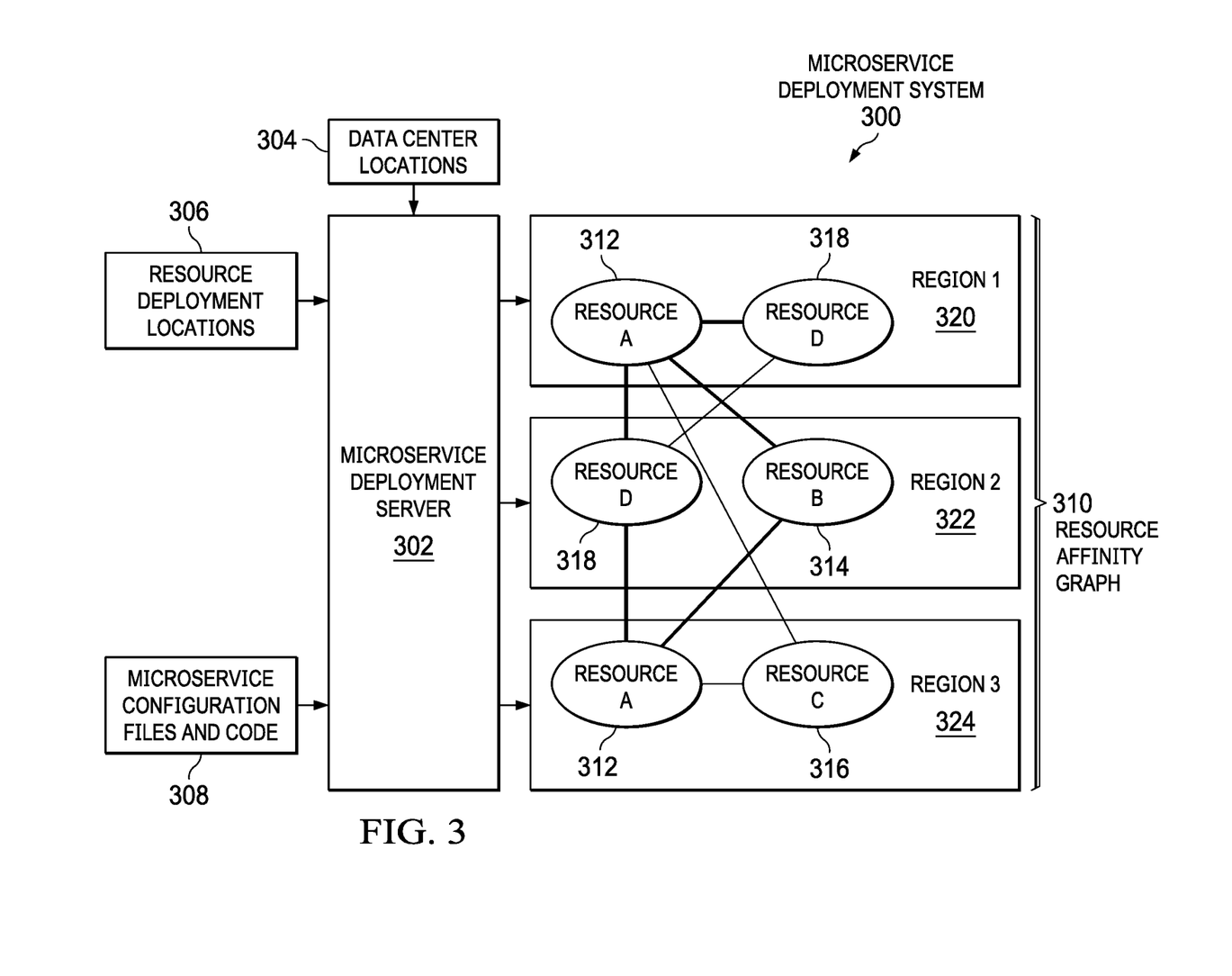
FIG. 3 is a diagram illustrating an example of a microservice deployment system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 may provide microservice deployment services to client data centers. Also, it should be noted that server 104 and server 106 may represent a multitude of servers in one or more data centers. Alternatively, server 104 and server 106 may represent computing nodes in one or more cloud environments.

Data center 110, data center 112, and data center 114 also connect to network 102. Data center 110, data center 112, and data center 114 are clients of server 104 and server 106. Data centers 110, 112, and 114 represent a plurality of geographically disparate data centers located globally, regionally, or within a locality of a region. Further, data centers 110, 112, and 114 each contain a plurality of data processing systems that perform a set of one or more services in response to receiving requests for those services from registered client device users.

Storage 108 is a network storage device capable of storing any type of data in a structured format or an unstructured format. In addition, storage 108 may represent a plurality of network storage devices. Further, storage 108 may store a list of data center locations, a list of resources associated with each data center, identifiers and network addresses for a plurality of different servers and data processing systems, identifiers for a plurality of different microservices, configuration files and code corresponding to each of the plurality of different microservices, microservice deployment compliance requirements, and the like. Furthermore, storage 108 may store other types of data, such as authentication or credential data that may include user names, passwords, and biometric data associated with system administrators and client device users, for example.

In addition, it should be noted that network data processing system 100 may include any number of additional servers, data centers, storage devices, and other data processing devices not shown. Program code located in network data processing system 100 may be stored on a computer readable storage medium and downloaded to a computer or other data processing device for use. For example, program code may be stored on a computer readable storage medium on server 104 and downloaded to a data processing system of data center 110 over network 102 for use on the data processing system.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard disk drive, a solid-state drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores microservice deployment manager 218. However, it should be noted that even though microservice deployment manager 218 is illustrated as residing in persistent storage 208, in an alternative illustrative embodiment microservice deployment manager 218 may be a separate component of data processing system 200. For example, microservice deployment manager 218 may be a hardware component coupled to communication fabric 202 or a combination of hardware and software components. In another alternative illustrative embodiment, a first set of components of microservice deployment manager 218 may be located in data processing system 200 and a second set of components of microservice deployment manager 218 may be located in a second data processing system, such as, for example, server 106 in FIG. 1.

Microservice deployment manager 218 controls the process of determining optimal placement of microservice 220 to minimize response time (i.e., latency) in network 228. Microservice 220 represents an identifier of a microservice that microservice deployment manager 218 is to deploy in one or more of data centers 230 of network 228. Microservice 220 may represent any type of microservice capable of performing any type of operation or functionality in response to a corresponding service request. In addition, microservice 220 may represent identifiers for a plurality of microservices.

Configuration file 222 contains data corresponding to microservice 220. In other words, configuration file 222 includes information, such as, for example, how to configure parameters and settings of microservice 220, resources utilized by microservice 220 during operation or execution of microservice 220, and the like. Code 224 is software code or source code corresponding to microservice 220. Code 224 may also include a listing of resources utilized by microservice 220 during operation. Deployment compliance requirements 226 represent one or more possible governmental regulations that control where microservice deployment manager 218 may deploy microservice 220 (i.e., the geographic location, such as region or locality, of a data center or data centers where microservice 220 may reside to process a particular type of data, such as personal consumer information). Microservice deployment manager 218 may retrieve configuration file 222, code 224, and deployment compliance requirements 226 from remote storage, such as storage 108 in FIG. 1.

Network 228 represents an identifier of a network, such as, for example, network 102 in FIG. 1, that couples data processing system 200 to data centers 230. Network 228 may represent any type of network. Data centers 230 represent identifiers of a plurality of geographically disparate data centers located globally, regionally, or the like.

Resources 232 represent a listing of available resources, such as, for example, other microservices, application programming interfaces (APIs), third-party APIs, databases, storage, application servers, application brokers, and the like, which reside in data centers 230. Location 234 identifies the geographic location (i.e., the particular data center) where each respective resource of resources 232 is currently deployed or capable of being deployed. Weight 236 represents a relative weighted value that microservice deployment manager 218 assigns to each of a set of one or more resources of resources 232, which microservice 220 utilizes during operation. For example, microservice deployment manager 218 may assign a relatively higher weighted value, such as, for example, 3.5, to a particular type of database that a large percentage of functionality of microservice 220 utilizes during operation, whereas microservice deployment manager 218 may assign a relatively lower weighted value, such as, for example, 1.0, to a particular type of API that a small percentage of functionality of microservice 220 utilizes during operation. In other words, weight 236 represents a relative significance of each resource to microservice 220 during operation. Microservice deployment manager 218 may identify the set of resources utilized by microservice 220 by, for example, parsing configuration file 222 and code 224.

Distance 238 represents a plurality of distance values, such as, for example, response times in milliseconds, that microservice deployment manager 218 determines between the identified geographic location (i.e., data center) of each resource in the set of resources utilized by microservice 220 and each site in possible deployment sites 240 for microservice 220. Possible deployment sites 240 represent one or more possible geographic locations (i.e., data centers) where microservice deployment manager 218 may deploy microservice 220 taking into account deployment compliance requirements 226. Response time 242 represents a lowest weighted-average response time, which microservice deployment manager 218 determines based on distance 238, for microservice deployment site 244. Microservice deployment site 244 represents the optimal site (i.e., data center) for microservice deployment manager 218 to deploy microservice 220 to minimize response time in network 228. Thus, microservice deployment manager 218 increases performance of microservice 220 by decreasing response times of microservice 220 to service requests and increases performance of network 228 by decreasing latency in network 228.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 246 is located in a functional form on computer readable media 248 that is selectively removable and may be loaded onto or transferred to data processing system 200 for running by processor unit 204. Program code 246 and computer readable media 248 form computer program product 250. In one example, computer readable media 248 may be computer readable storage media 252 or computer readable signal media 254. Computer readable storage media 252 may include, for example, an optical or magnetic disc that is inserted or placed into a drive or other device that is part of persistent storage 208 for transfer onto a storage device, such as a hard drive, that is part of persistent storage 208. Computer readable storage media 252 also may take the form of a persistent storage, such as a hard drive, a thumb drive, or a flash memory that is connected to data processing system 200. In some instances, computer readable storage media 252 may not be removable from data processing system 200.

Alternatively, program code 246 may be transferred to data processing system 200 using computer readable signal media 254. Computer readable signal media 254 may be, for example, a propagated data signal containing program code 246. For example, computer readable signal media 254 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 246 may be downloaded over a network to persistent storage 208 from another device or data processing system through computer readable signal media 254 for use within data processing system 200. For instance, program code stored in a computer readable storage media in a data processing system may be downloaded over a network from the data processing system to data processing system 200. The data processing system providing program code 246 may be a server computer, a client computer, or some other device capable of storing and transmitting program code 246.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 252 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Containers are becoming very popular with developers and Kubernetes is becoming the de-facto standard for container orchestration. Currently, all containers are deployed in a cluster based mainly on availability and load metrics. Existing solutions for container deployment and orchestration do not consider back-end resource affinity, locality, region (i.e., multiple localities), and network latency as factors in deciding where to deploy the containers.

Illustrative embodiments deploy microservices based on their affinities to back-end resources as defined in microservice configuration file parameters and microservice code. Applications typically consist of multiple microservices, where each microservice has multiple dependencies on resources, such as, for example, databases, other microservices, third-party APIs, storage, application servers, and the like. Illustrative embodiments evaluate the geographic locations (i.e., locality, region, and the like) where these resources are already deployed, or are available to be deployed, and accordingly identify the optimal location for deploying the microservices to decrease or minimize network response times.

It should be noted that other deployment compliance restrictions, such as, for example, multiple data centers or data regions, for high availability and disaster recovery are assumed as a baseline. Effectively, if a microservice needs to run in a data center in Europe in accordance with the General Data Protection Regulation (GDPR), then the set of candidate data centers will be limited to data centers in Europe. The GDPR is a regulation in European Union law regarding data protection and privacy for citizens of the European Union and the European Economic Area. It also addresses the transfer of personal data outside the European Union and the European Economic Area. As a result, illustrative embodiments will optimize microservice deployment within that set of candidate data centers. Thus, illustrative embodiments optimize the deployment of microservices based not only on availability and load of back-end resources, but also on the geographic locations of the back-end resources utilized by the microservices.

Illustrative embodiments inspect microservice configuration files, as well as microservice code, to identify resources utilized by each microservice. As used herein, a resource may be any type of resource, such as, for example, a database, another microservice, a third-party API, an application server, application broker, storage, or the like. It should be noted that microservices are utilizing more and more third-party APIs, as more and more functionalities are provided via these third-party APIs.

Based on the identification of resources utilized by a microservice, illustrative embodiments generate a resource affinity graph comprised of a plurality of nodes and edges, where each node in the graph represents a resource utilized by the microservice and each edge between nodes indicates a level of affinity or dependency between the different resources. For example, by parsing a configuration file corresponding to the microservice, illustrative embodiments may identify a particular type of database, such as, for example, a structured query language database, as a resource utilized by the microservice. Further, by parsing the code of the microservice, illustrative embodiments may identify another resource, such as, for example, a particular type of assistant service API, utilized by the microservice.

Illustrative embodiments identify the set of all resources utilized by a microservice by parsing configuration files and code corresponding to the microservice. Further, illustrative embodiments identify the geographic locations (i.e., data centers) where each resource in the set of all resources utilized by the microservice are currently deployed. For example, some of the resources in the set may already be deployed in specific data centers (e.g., a particular third-party API utilized by the microservice may only be available in a data center in Dallas, whereas another resource utilized by the microservice, such as a particular database, may be deployed in a data center in the District of Columbia).

Illustrative embodiments assign different weight values to the different resources utilized by the microservice. For example, for a given resource ("i"), illustrative embodiments assign a particular weight value ("wi"). The assigned weight values need not be exact, but rather represent a relative significance of each respective resource to the microservice. For example, illustrative embodiments may assign a particular type of API resource a weight of 1.5, another type of API resource (e.g., a third-party API) a weight of 1.0, a particular type of database resource a weight of 2.5, another type of database resource (e.g., SQL database) a weight of 3.5, another microservice resource a weight of 1.0, and the like. These relative weight values provide useful information on how to optimize deployment of the microservice.

Further, illustrative embodiments define a set of one or more geographic locations (e.g., data centers) for deploying the microservice. Illustrative embodiments take into account regulatory deployment constraints (e.g., a certain microservice has to reside within a specific geographic region, such as Europe). Furthermore, illustrative embodiments define the optimization problem based on the collected information. For example, if the objective of illustrative embodiments is to optimize microservice response time, then illustrative embodiments define the objective function as follows:

$$RT = w1*d1 + w2*d2 + w3*d3 \ldots + wn*dn,$$

where "RT" is the response time, "w1" is the relative significance of resource "1" to the microservice, "d1" is the distance between the location of resource 1 and the deployment site of the microservice, "w2" is the relative significance of resource "2" to the microservice, "d2" is the distance between the location of resource 2 and the deployment site of the microservice, "w3" is the relative significance of resource "3" to the microservice, "d3" is the distance between the location of resource 3 and the deployment site of the microservice, and so on up to the last resource "n". In other words, the distance of a given resource ("di") is a measure of the distance between the microservice deployment site and the location of the given resource i. The minimum response time is subject to the microservice being deployed to the set of one or more locations.

For example, if the given resource i is a database resource located in Frankfurt and the microservice is deployed in Dallas, then the distance di for the given resource i from the microservice deployment site would be 350 milliseconds, for example. On the other hand, if the microservice is also deployed in Frankfurt, then the distance di for the given resource i would be 100 milliseconds, for example. In other words, the distance is measured by the response time between the resource and the microservice and not by physical distance.

Using the objective function above to minimize microservice response time, illustrative embodiments are able to determine the optimal or best geographic location (i.e., data center) to deploy the microservice so that response time by the microservice is minimized. It should be noted that a typical application consists of multiple microservices and illustrative embodiments are capable of performing optimal deployment of any number of microservices subject to relative resource weights and conditions that satisfy all of the microservices. However, it should be noted that illustrative embodiments may alter the objective function to achieve a different objective, such as, for example, minimizing microservice deployment cost. Moreover, illustrative embodiments may work equally well for high availability and disaster recovery deployments where illustrative embodiments may iteratively apply the deployment of each microservice instance. In addition, even though illustrative embodiments are presented in the context of microservice resource affinity herein, illustrative embodiments may equally apply to deploying microservices close to target end-users. As a result, illustrative embodiments may account for both microservice back-end resource affinity and microservice end-user affinity.

Thus, illustrative embodiments provide one or more technical solutions that overcome a technical problem with optimally deploying microservices to minimize response time within a network. As a result, these one or more technical solutions provide a technical effect and practical application in the field of microservices and networks.

With reference now to FIG. 3, a diagram illustrating an example of a microservice deployment system is depicted in accordance with an illustrative embodiment. Microservice deployment system 300 may be implemented in a network of data processing systems, such as network data processing system 100 in FIG. 1. Microservice deployment system 300 is a system of hardware and software components for optimally deploying a microservice within a network to minimize microservice response time based on back-end resource affinity and locations.

In this example, microservice deployment system 300 includes microservice deployment server 302. Microservice deployment server 302 may be, for example, server 104 in FIG. 1 or data processing system 200 in FIG. 2. Microservice deployment server 302 receives data center locations 304, resource deployment locations 306, and microservice configuration files and code 308 from one or more storage devices, such as storage 108 in FIG. 1.

Microservice deployment server 302 utilizes data center locations 304, resource deployment locations 306, and microservice configuration files and code 308 to generate resource affinity graph 310. Resource affinity graph 310 shows affinity relationships between various resources, such as resource A 312, resource B 314, resource C 316, and resource D 318. Resource A 312 may be, for example, an application broker resource. Resource B 314 may be, for example, a storage resource. Resource C 316 may be, for example, an application server resource. Resource D 318 may be, for example, a database resource. In this example, resource A 312 and resource D 318 are deployed in region 1 320, which may be Europe, for example. Resource D 318 and resource B 314 are deployed in region 2 322, which may be North America, for example. Resource A 312 and resource C 316 are deployed in region 3 324, which may be Asia, for example.

In resource affinity graph 310, thickness of an edge connecting two resources illustrates a level of dependency between those two resources. For example, the thickest edge between resource A 312 (e.g., application broker) and resource D 318 (e.g., database) indicates that it is optimal for microservice deployment server 302 to deploy resource A 312 and resource D 318 as close geographically as possible to minimize microservice response time.

Figure 4A:
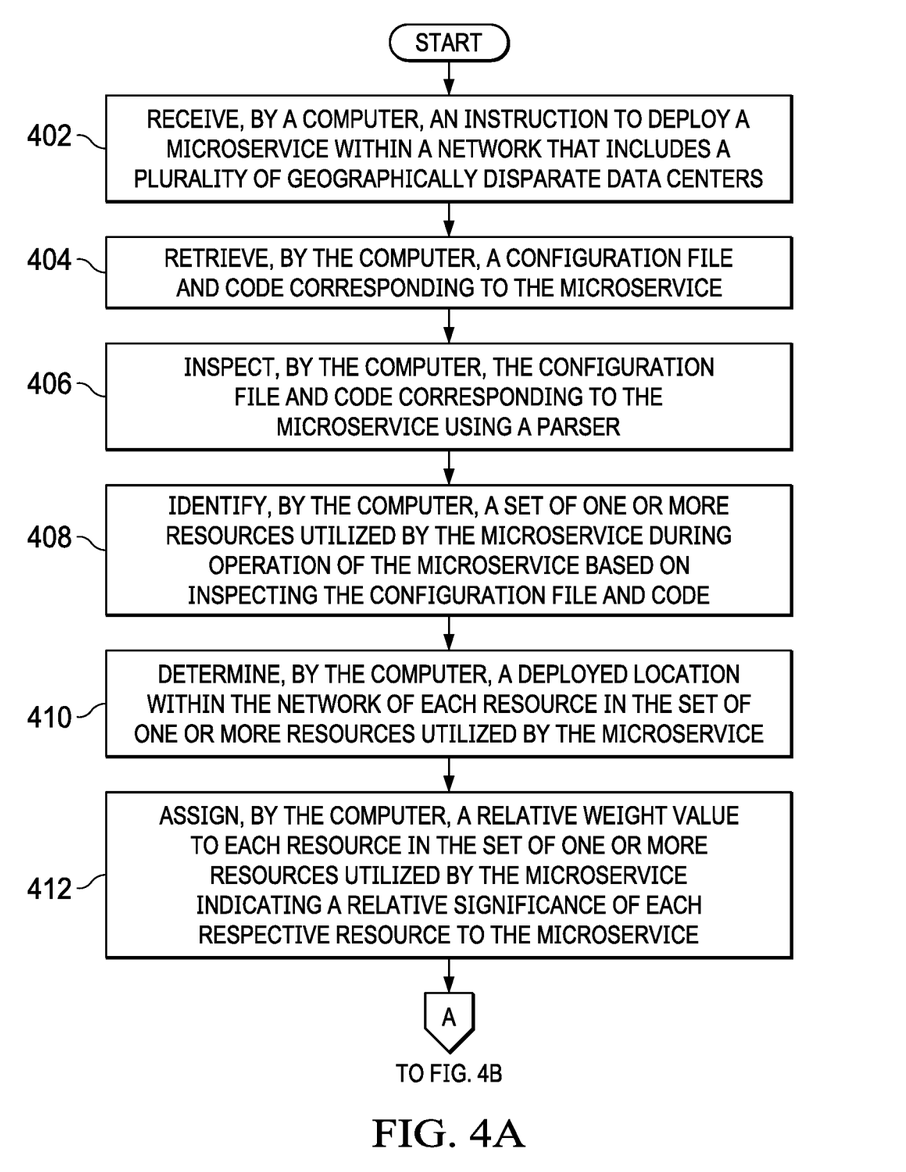
FIGS. 4A-4B are a flowchart illustrating a process for determining microservice placement to minimize response time in a network in accordance with an illustrative embodiment.
Figure 4B:
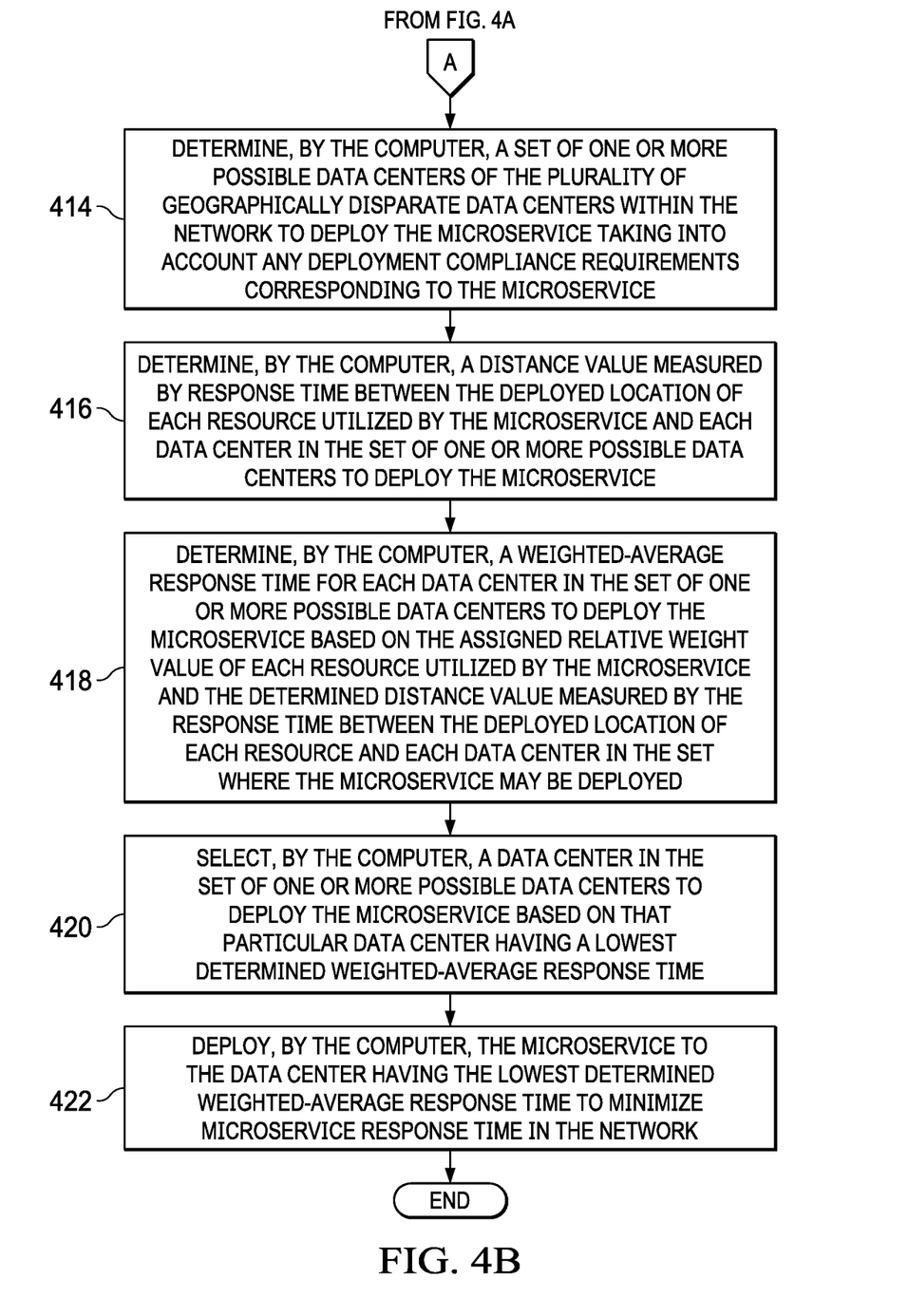

With reference now to FIGS. 4A-4B, a flowchart illustrating a process for determining microservice placement to minimize response time in a network is shown in accordance with an illustrative embodiment. The process shown in FIGS. 4A-4B may be implemented in a computer, such as, for example, server 104 in FIG. 1, data processing system 200 in FIG. 2, or microservice deployment server 302 in FIG. 3.

The process begins when the computer receives an instruction to deploy a microservice within a network that includes a plurality of geographically disparate data centers (step 402). The microservice may be, for example, microservice 220 in FIG. 2. The network and plurality of geographically disparate data centers may be, for example, network 102 and data centers 110-114 in FIG. 1 or network 228 and data centers 230 in FIG. 2. The computer retrieves a configuration file and code corresponding to the microservice (step 404). The configuration file and code may be, for example, configuration file 222 and code 224 in FIG. 2. Also, the computer may retrieve the configuration file and code from storage, such as storage 108 in FIG. 1.

The computer inspects the configuration file and code corresponding to the microservice using a parser component (step 406). Alternatively, the computer may utilize, for example, a natural language processor component to inspect the configuration file and code. The computer identifies a set of one or more resources utilized by the microservice during operation or execution of the microservice based on inspecting the configuration file and code (step 408). The set of resources may be, for example, resources 232 in FIG. 2 and may include one or more other microservices, APIs, third-party APIs, databases, storage, application servers, or any combination thereof. In addition, the computer determines a deployed location within the network of each resource in the set of one or more resources utilized by the microservice (step 410). The deployed location of each resource is the corresponding data center or data centers where each respective resource is currently located.

Further, the computer assigns a relative weight value to each resource in the set of one or more resources utilized by the microservice indicating a relative significance of each respective resource to the microservice during operation (step 412). The relative significance of a particular resource to the microservice may be, for example, a percentage of operations or functions of the microservice that use that particular resource. For example, if the computer determines that 90% of the operations or functionality of the microservice utilize a particular resource, then the computer assigns a relatively high weight value to that particular resource. Conversely, if the computer determines that only 10% of the operations or functionality of the microservice utilize a particular resource, then the computer assigns a relatively low weight value to that particular resource.

Furthermore, the computer determines a set of one or more possible data centers of the plurality of geographically disparate data centers within the network to deploy the microservice taking into account any deployment compliance requirements corresponding to the microservice (step 414). The deployment compliance requirements may be, for example, regulatory laws, such as the GDPR, governing where a microservice may be deployed based on the type of data utilized by the microservice and how the microservice may utilize that data. Moreover, the computer determines a distance value measured by response time between the deployed location of each resource utilized by the microservice and each data center in the set of one or more possible data centers to deploy the microservice (step 416).

Afterward, the computer determines a weighted-average response time for each data center in the set of one or more possible data centers to deploy the microservice based on the relative weight value assigned to each respective resource in the set of resources utilized by the microservice and the determined distance value measured by the response time between the deployed location of each respective resource and each respective data center in the set of possible data centers where the microservice may be deployed (step 418). The computer may utilize, for example, an objective function, as shown above, to determine the weighted-average response time for each data center in the set of one or more possible data centers. The computer selects a data center in the set of one or more possible data centers to deploy the microservice based on that particular data center having a lowest determined weighted-average response time (step 420). Then, the computer deploys the microservice to the data center having the lowest determined weighted-average response time to minimize response time of the microservice in the network (step 422). Thereafter, the process terminates.

Thus, illustrative embodiments of the present invention provide a computer-implemented method, computer system, and computer program product for determining microservice placement within a network, which includes a plurality of geographically disparate data centers, to minimize microservice response time based on back-end resource affinity and deployment locations. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining microservice placement to minimize response time in a network, the method comprising:
    identifying a set of resources utilized by a microservice during operation of the microservice based on inspecting a configuration file and code of the microservice;
    determining a deployed location within the network of each resource in the set of resources utilized by the microservice;
    assigning a relative weight value to each resource in the set of resources utilized by the microservice indicating a relative significance of each respective resource to the microservice during operation;
    determining a weighted-average response time for each data center in a set of possible data centers to deploy the microservice based on the relative weight value assigned to each respective resource utilized by the microservice and a determined distance value measured by response time between the deployed location of each respective resource in the set of resources and each respective data center in the set of possible data centers where the microservice may be deployed;
    selecting a data center in the set of possible data centers to deploy the microservice based on the data center having a lowest determined weighted-average response time; and
    deploying the microservice to the data center having the lowest determined weighted-average response time to minimize response time of the microservice in the network.

2. The method of claim 1 further comprising:
    receiving an instruction to deploy the microservice within the network, the network including a plurality of geographically disparate data centers;
    retrieving a configuration file and code corresponding to the microservice from storage; and
    inspecting the configuration file and code corresponding to the microservice by parsing the configuration file and code.

3. The method of claim 2 further comprising:
    determining the set of possible data centers from the plurality of geographically disparate data centers within the network to deploy the microservice taking into account deployment compliance requirements corresponding to the microservice, wherein the deployment compliance requirements are regulatory laws governing where the microservice may be deployed based on a type of data utilized by the microservice and how the microservice utilizes that data.

4. The method of claim 1 further comprising:
    determining the distance value measured by the response time between the deployed location of each respective resource in the set of resources utilized by the microservice and each respective data center in the set of possible data centers to deploy the microservice.

5. The method of claim 1, wherein the set of resources utilized by the microservice during operation is selected from a group consisting of one or more other microservices, application programming interfaces, third-party application programming interfaces, databases, storage, and application servers.

6. The method of claim 1, wherein an objective function is utilized to determine the weighted-average response time for each respective data center in the set of possible data centers.

7. A computer system for determining microservice placement to minimize response time in a network, the computer system comprising:
    a bus system;
    a storage device connected to the bus system, wherein the storage device stores program instructions; and
    a processor connected to the bus system, wherein the processor executes the program instructions to:
        identify a set of resources utilized by a microservice during operation of the microservice based on inspecting a configuration file and code of the microservice;
        determine a deployed location within the network of each resource in the set of resources utilized by the microservice;
        assign a relative weight value to each resource in the set of resources utilized by the microservice indicating a relative significance of each respective resource to the microservice during operation;

determine a weighted-average response time for each data center in a set of possible data centers to deploy the microservice based on the relative weight value assigned to each respective resource utilized by the microservice and a determined distance value measured by response time between the deployed location of each respective resource in the set of resources and each respective data center in the set of possible data centers where the microservice may be deployed;

select a data center in the set of possible data centers to deploy the microservice based on the data center having a lowest determined weighted-average response time; and deploy the microservice to the data center having the lowest determined weighted-average response time to minimize response time of the microservice in the network.

8. The computer system of claim 7, wherein the processor further executes the program instructions to:

receive an instruction to deploy the microservice within the network, the network including a plurality of geographically disparate data centers;

retrieve a configuration file and code corresponding to the microservice from storage; and inspect the configuration file and code corresponding to the microservice by parsing the configuration file and code.

9. The computer system of claim 8, wherein the processor further executes the program instructions to:

determine the set of possible data centers from the plurality of geographically disparate data centers within the network to deploy the microservice taking into account deployment compliance requirements corresponding to the microservice, wherein the deployment compliance requirements are regulatory laws governing where the microservice may be deployed based on a type of data utilized by the microservice and how the microservice utilizes that data.

10. The computer system of claim 7, wherein the processor further executes the program instructions to:

determine the distance value measured by the response time between the deployed location of each respective resource in the set of resources utilized by the microservice and each respective data center in the set of possible data centers to deploy the microservice.

11. The computer system of claim 7, wherein the set of resources utilized by the microservice during operation is selected from a group consisting of one or more other microservices, application programming interfaces, third-party application programming interfaces, databases, storage, and application servers.

12. A computer program product for determining microservice placement to minimize response time in a network, the computer program product comprising a computer readable storage medium having program instructions embodied therewith, the program instructions executable by a computer to cause the computer to perform a method comprising:

identifying a set of resources utilized by a microservice during operation of the microservice based on inspecting a configuration file and code of the microservice;

determining a deployed location within the network of each resource in the set of resources utilized by the microservice;

assigning a relative weight value to each resource in the set of resources utilized by the microservice indicating a relative significance of each respective resource to the microservice during operation;

determining a weighted-average response time for each data center in a set of possible data centers to deploy the microservice based on the relative weight value assigned to each respective resource utilized by the microservice and a determined distance value measured by response time between the deployed location of each respective resource in the set of resources and each respective data center in the set of possible data centers where the microservice may be deployed;

selecting a data center in the set of possible data centers to deploy the microservice based on the data center having a lowest determined weighted-average response time; and deploying the microservice to the data center having the lowest determined weighted-average response time to minimize response time of the microservice in the network.

13. The computer program product of claim 12 further comprising:

receiving an instruction to deploy the microservice within the network, the network including a plurality of geographically disparate data centers;

retrieving a configuration file and code corresponding to the microservice from storage; and inspecting the configuration file and code corresponding to the microservice by parsing the configuration file and code.

14. The computer program product of claim 13 further comprising:

determining the set of possible data centers from the plurality of geographically disparate data centers within the network to deploy the microservice taking into account deployment compliance requirements corresponding to the microservice, wherein the deployment compliance requirements are regulatory laws governing where the microservice may be deployed based on a type of data utilized by the microservice and how the microservice utilizes that data.

15. The computer program product of claim 12 further comprising:

determining the distance value measured by the response time between the deployed location of each respective resource in the set of resources utilized by the microservice and each respective data center in the set of possible data centers to deploy the microservice.

16. The computer program product of claim 12, wherein the set of resources utilized by the microservice during operation is selected from a group consisting of one or more other microservices, application programming interfaces, third-party application programming interfaces, databases, storage, and application servers.

17. The computer program product of claim 12, wherein an objective function is utilized to determine the weighted-average response time for each respective data center in the set of possible data centers.

* * * * *